Sept. 2, 1969     C. D. MULLINIX     3,464,832

FOOD PACKAGING

Filed Nov. 22, 1965     5 Sheets-Sheet 1

INVENTOR.
CHARLES D. MULLINIX
BY Stanley Bialos
ATTORNEY

Sept. 2, 1969   C. D. MULLINIX   3,464,832
FOOD PACKAGING

Filed Nov. 22, 1965   5 Sheets-Sheet 2

INVENTOR.
CHARLES D. MULLINIX
BY
Stanley Bialos
ATTORNEY

Sept. 2, 1969           C. D. MULLINIX           3,464,832
FOOD PACKAGING
Filed Nov. 22, 1965           5 Sheets-Sheet 3
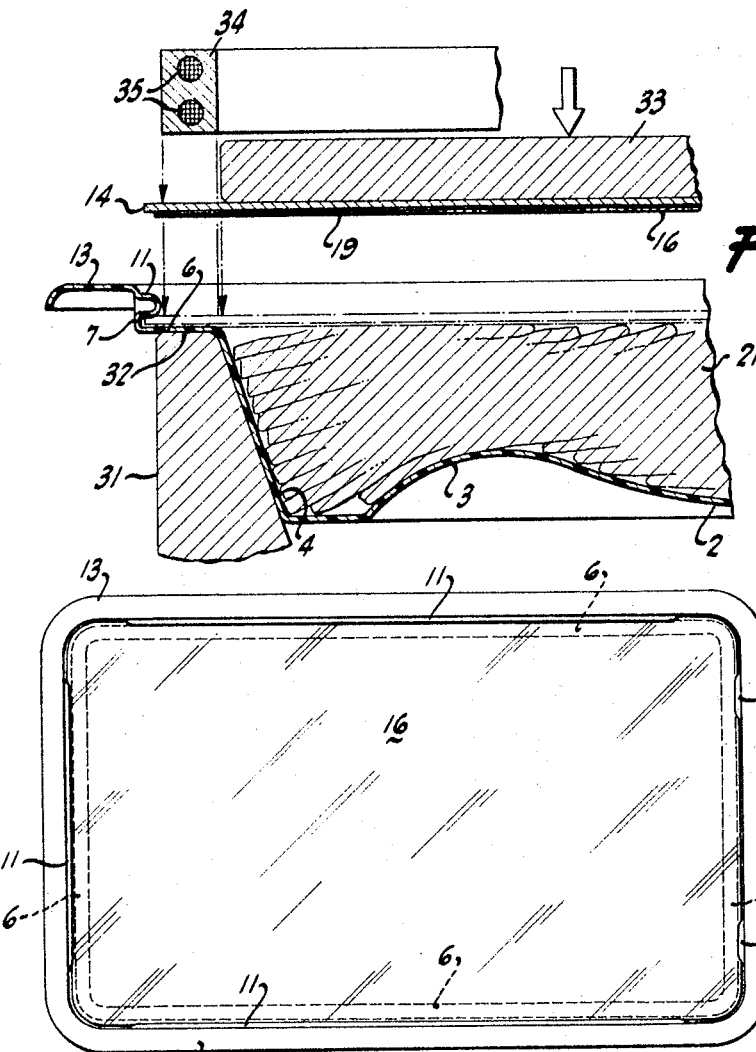
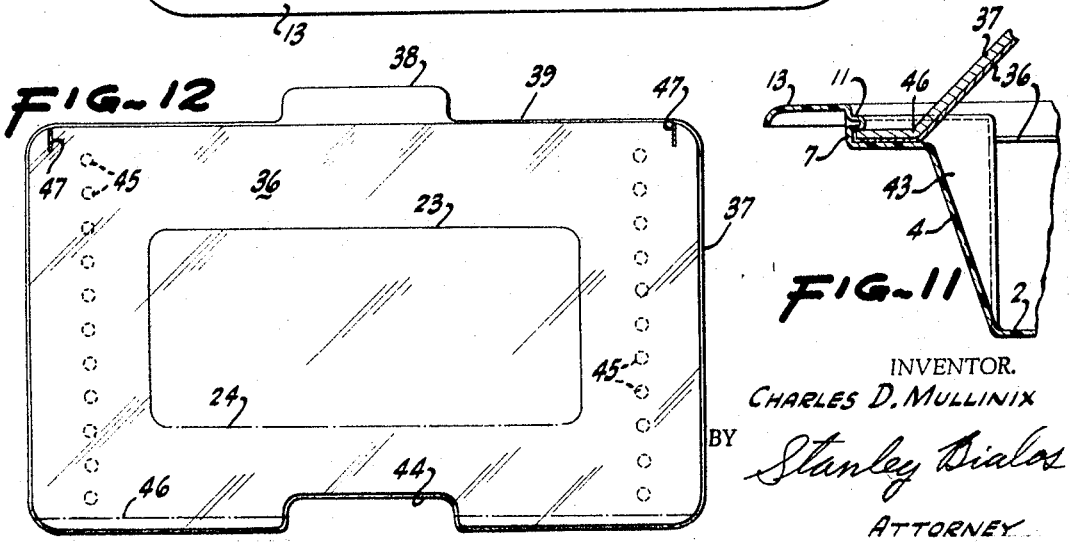
INVENTOR.
CHARLES D. MULLINIX
BY Stanley Bialos
ATTORNEY Sept. 2, 1969 C. D. MULLINIX 3,464,832
FOOD PACKAGING Filed Nov. 22, 1965 5 Sheets-Sheet 4

INVENTOR.
CHARLES D. MULLINIX
BY Stanley Bialer
ATTORNEY

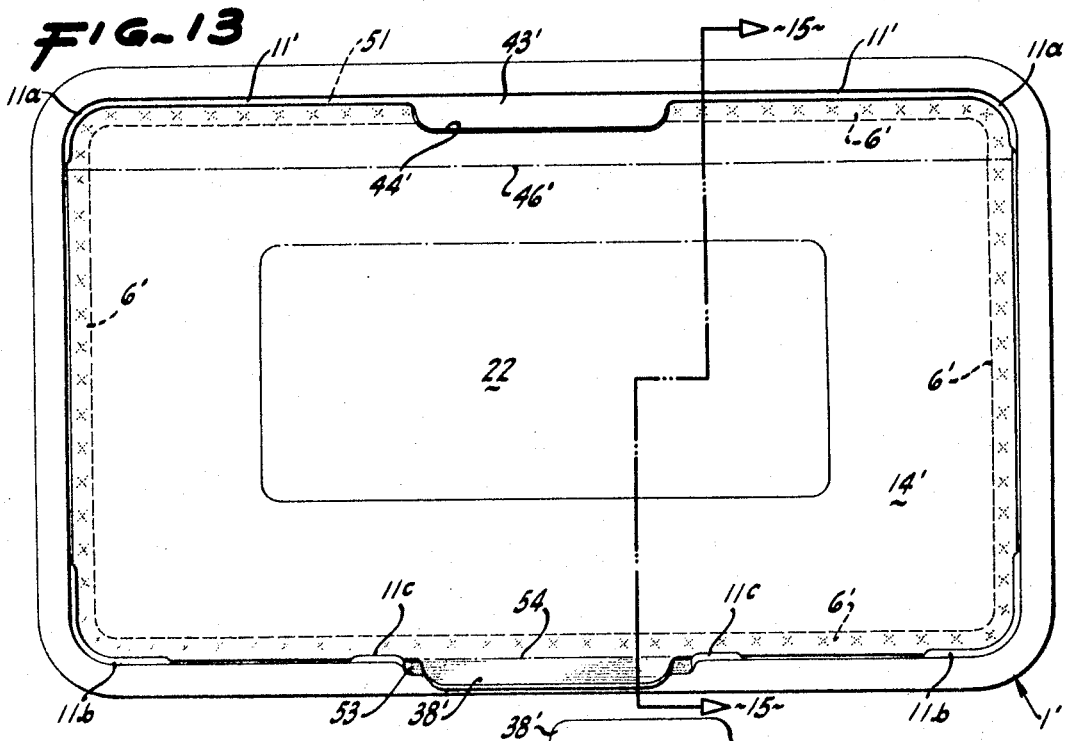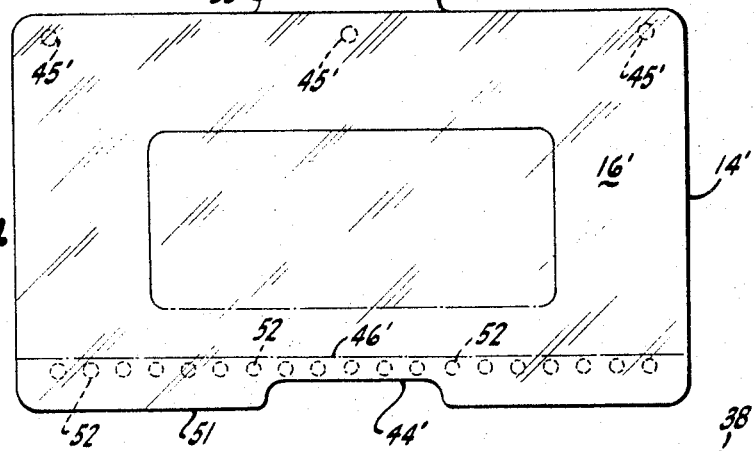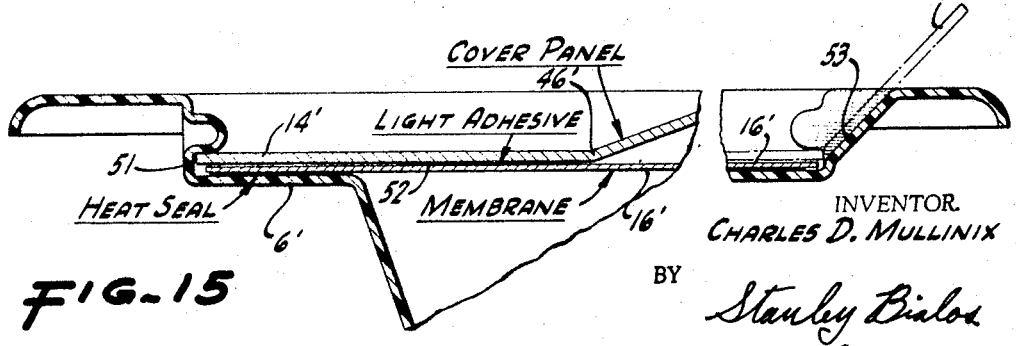

United States Patent Office 3,464,832
Patented Sept. 2, 1969

3,464,832
FOOD PACKAGING
Charles D. Mullinix, 465 Golden Road,
Fallbrook, Calif. 92028
Filed Nov. 22, 1965, Ser. No. 509,129
Int. Cl. B65b *25/06*
U.S. Cl. 99—171                3 Claims

ABSTRACT OF THE DISCLOSURE

A food package comprises a tray part having a flat peripheral shoulder, and a cover structure snap locked to the tray and which is composed of a flat light-transmitting membrane weakly adhered to an opaque flat cover panel to enable the panel to be peeled from the membrane. The membrane is heat sealed to the shoulder; and the cover panel has a pull tab projecting from one edge. A score line hinge connection is provided along its opposite edge.

In assembling the package, the tray is supported on a ring, the cover panel and membrane are snap locked to the tray while thus supported, and bonding of the membrane to the seating shoulder is effected while the tray is supported on the seating shoulder.

---

This invention relates to food packaging, and more particularly, to a tray and cover structure assembly and method of packaging, adapted especially for the packaging of food products. It has been found particularly adapted for the packaging of meat products, such as sausages, hamburger patties, ham, and especially a greasy product, such as bacon, although the invention is applicable to non-meat products, for example, frozen vegetables, dehydrated foods, purees, or the like.

With respect to bacon for which the invention is specially adapted, it presents packaging problems because unless the package is vacuum packed and gas flushed, it should be so-called breathable to preclude the bacon from sweating and becoming unsightly. Also, to preclude darkening of the bacon, it is desirable to have the package substantially lightproof. Yet, it is advantageous to the housewife who purchases such product to have the ability of inspecting the contents of the package readily, and after purchase thereof to be able to reclose the package for repeated use in the household.

Summarizing this invention, it accomplishes the results indicated, although many advantages of the package, its components, and method of packaging as explained hereinafter, are obtained even if the package is rendered non-breathable in cases where the bacon is gas flushed and packed in vacuum.

A tray part is provided, desirably of flexible breathable material, namely, one which has sufficient porosity to enable ventilation. Such tray part is formed with a peripheral seating shoulder to support a cover structure; and an upstanding flange is provided adjacent the periphery of the shoulder and has inwardly projecting locking means to enable the cover structure to be snap locked in position.

The cover structure comprises a cover panel which is desirably of opaque material, and is bonded at spaced apart zones to a breathable, light-transmitting membrane of heat-sealable material which, when the package is formed with bacon in the tray, is adhesively bonded by heat sealing to the seating shoulder. The cover panel is desirably formed with a hinged panel section which is openable and reclosable to provide for inspection of contents in the tray and ventilation through the breathable membrane.

In an embodiment of the invention, the membrane is adhered or bonded to the underside of the cover panel by an adhesive which provides a weaker bond than the heat seal bond of the membrane to the seating shoulder. Consequently, the cover panel can be readily peeled away from the membrane; and an outwardly projecting pull tab is provided on the cover panel to enable such peeling of the cover panel.

In another embodiment, the heat seal bonding of the membrane to the seating shoulder is omitted at one edge of the shoulder; and a pull tab is provided on the cover panel adjacent such edge, thus enabling the cover panel to be unhinged by pulling of the pull tab. In such instance the membrane will tear along opposite side edges of the tray to provide a completely reclosable cover.

The above arrangement of the seating shoulder and heat-sealable membrane are such that when the tray is filled with contents it is readily heat sealable to the membrane attached to the cover panel, by supporting the seating shoulder of the tray on a ring and snap locking the cover structure in position by forcing it downwardly, and applying heat adjacent the seating shoulder while the tray is supported on such seating shoulder.

From the preceding it is seen that the invention has as its objects, among others, the provision of an improved tray and cover structure assembly for packaging of food products, which will permit ready inspection of the contents, protect the contents and, provide for ready reclosing of the cover structure after it is once opened, and which are of such character as to enable the same to be easily packaged with contents therein, all of economical and simple construction. Other objects of the invention will become apparent from a perusal of the following more detailed description, and accompanying drawings in which:

FIG. 7 is a plan view of the tray with the membrane remaining sealed to the seating shoulder, and the cover panel removed;

FIG. 8 is a schematic fragmentary vertical sectional view illustrating the method of forming and heat sealing the package;

FIG. 11 is an enlarged fragmentary vertical section taken in the plane indicated by the line 11—11 in FIG. 9;

FIG. 12 is a plan view of the cover structure looking at the membrane side; and

FIG. 13 is a plan view, similar to FIGURE S1 and 9, of an additional embodiment of the invention;

FIG. 14 is a plan view, on a reduced scale, of the cover structure employed in the embodiment of FIG. 13;

Figure 16:
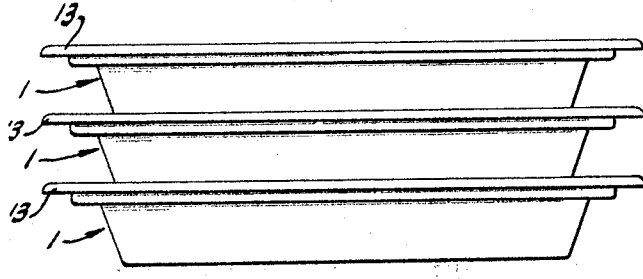

FIG. 15 is a transverse, vertical section on an enlarged scale, taken in planes indicated by line 15—15 in FIGURE 13 with the intermediate portion of the structure omitted to shorten the view; the left hand portion of the view illustrating the cover panel partially unhinged, while the right hand portion of the view illustrates in phantom lines the cover panel in fully snap-locked position; and FIG. 16 is an elevational view on a reduced scale illustrating the manner of stacking the packages hereof.

Referring to the embodiment of FIGURES 1 through 7, the tray part 1 is of generally rectangular shape and is made desirably of breathable plastic material, the character of which will be discussed more fully hereinafter. It is integrally molded and comprises a bottom 2 formed with humps 3 extending lengthwise of the tray to elevate the thinner edges of shingled bacon and thus form a substantially even, flat top surface of the bacon in the package. Sides 4 of the tray desirably taper outwardly and terminate in a horizontal peripheral flange which provides a seating shoulder 6 for a special type of cover structure to be described. Upstanding from adjacent the outer edge of seating shoulder 6 is a short peripheral flange 7 which form a well 8 for reception of cover structure 9.

Figure 1:
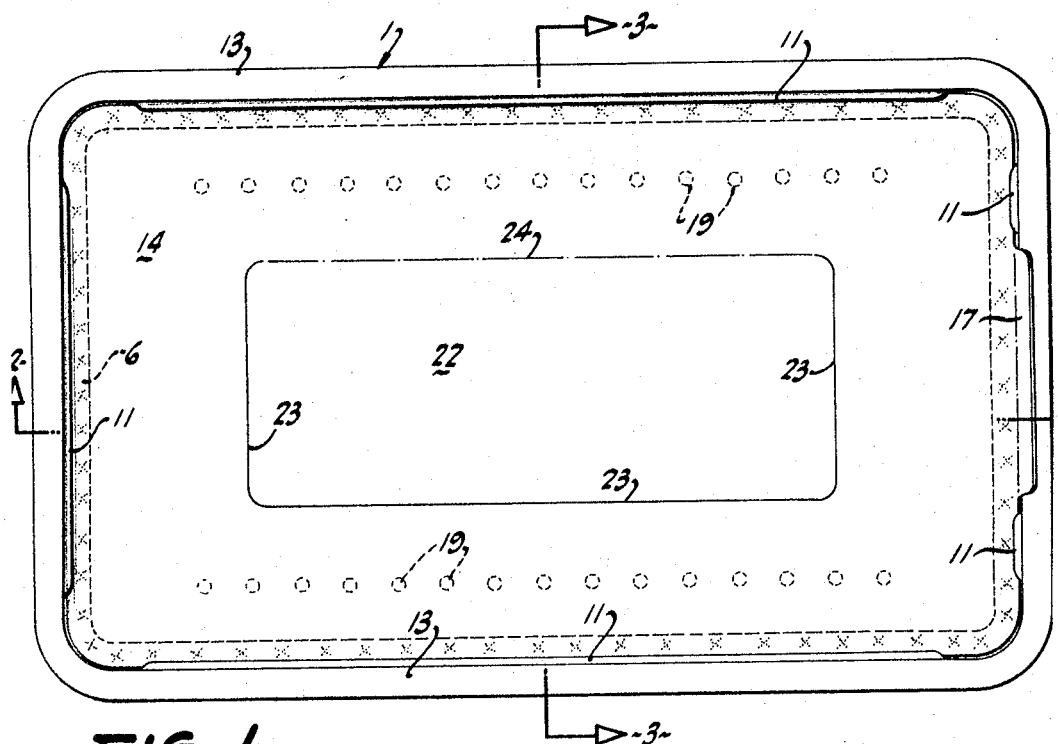
FIG. 1 is a plan view of an embodiment of the package hereof on a reduced scale.
Figure 2:
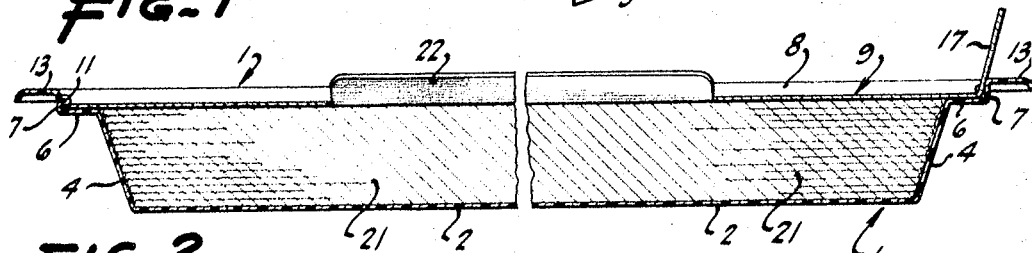
FIG. 2 is a longitudinal section taken in the plane indicated by the line 2—2 of FIG. 1; the scale being substantially full as to height but shortened as to length as indicated by the break therein.
Figure 3:
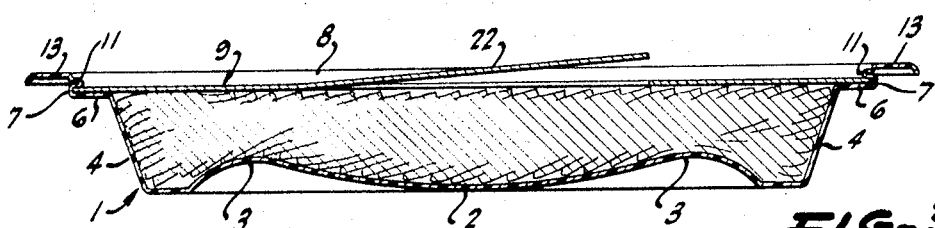
FIG. 3 is a substantially full scale section taken in the plane indicated by line 3—3 in FIG. 1.

Snap lock means is formed integrally on flange 7, comprising inwardly projecting bead portions 11 above seating shoulder 6 and which are spaced apart, as shown in FIG. 1, to facilitate snap locking of the cover structure 9. Beads 11 are spaced from the upper surface of shoulder 6 as indicated at 12, in which spaces over the shoulder the cover structure 9 is adapted to be snap locked. At its upper end, upstanding flange 7 terminates in an outwardly extending rim 13.

As previously related, it is advantageous to have a breathable package. In other words, the tray should be of material sufficiently porous to provide for ventilation of the contents therein. An advantageous lightweight and flexible material from which the tray is integrally molded and which serves such function, is high impact polystyrene plastic of about 11 point (0.011 inch in thickness) although the thickness may vary from 8 to 15 point, but this is not critical. As alternative materials, the tray may be of molded cellulosic pulp, or paperboard or any other suitable breathable material. If the package is gas flushed under vacuum, then the tray may be made of any other type of non-breathable material such as polyethylene or other plastics.

Although dimensions of the tray are not critical, the following approximate dimensions are suitable for the packaging of a pound of shingled bacon: a length of about 10 inches between the outside edges of end shoulder portions 6 and a width of about 6 inches between the outside edges of the side shoulder portions, with the shoulder about 5/16 inch wide and the rim 13 of about equal width. Upstanding flange 7 is about 3/16 of an inch high, and beads 11 about midway of flange 7 and about 1/16 of an inch wide and about the same in height, with the spaces 12 underneath the beads about 1/16 of an inch in height. The overall height of the tray is about 15/16 of an inch. Since the tray is of readily flexible material, upstanding flange 7 will readily yield when the cover structure 9 is forced downwardly to snap lock under the beads 11 in a manner to be subsequently described.

Referring to cover structure 9, it comprises an opaque cover panel 14 and a heat-sealable light-transmitting plastic membrane adhered to the cover panel. The panel is of substantially rectangular shape of substantially the same outer dimensions as peripheral seating flange 6 so as to fit within the confines of upstanding flange 7, but has an integral pull tab portion 17 hingedly connected to and projecting outwardly from an end edge thereof. Membrane 16 is substantially complementary in shape to the cover panel except for pull tab portion 17, thus overlying substantially the entire area of the panel except the pull tab portion area; and the membrane is bonded to the cover panel by spots of adhesive 19. Two rows of such adhesive are provided along narrow spaced apart zones, to insure that the membrane will remain secured flat with cover panel 14 but at the same time provide limited areas of adherence. Although spots of adhesive are shown in each row, the adhesive of each row may be a continuous line.

The adhesive bond between membrane 16 and cover panel 14 is relatively weak so that when the membrane is adhered to seating shoulder 6 by heat sealing about the entire periphery thereof, as indicated by the stippled crosses in FIG. 1, the cover panel can be readily peeled away from the membrane while leaving the membrane sealed intact to seating shoulder 6 since the membrane portion adhered to the seating shoulder does not overlie the area of pull tab portion 17, it is unattached to the pull tab. Consequently, when the pull tab is grasped to peel away the cover panel the membrane will not be simultaneously grasped and torn. Any suitable adhesive or bond may be employed between the membrane and the cover panel which is weaker than the heat seal bond which the membrane is adapted to form with seating shoulder 6. For this purpose, conventional type latex emulsion adhesives are suitable, and are desirably employed. Pressure-sensitive adhesives and wax can also be utilized.

Desirably, cover panel 14 is of relatively stiff but still flexible kraft paperboard of about 20 point (0.020 inch) in thickness, saturated with and coated with wax on the outside face thereof; a suitable amount of wax being about 15 pounds per ream (3,000 square feet). However, any other suitable, relatively stiff but still flexible material can be employed for the cover panel which is desirably opaque to protect the bacon 21 in the final package.

As one of the desirable types of packages is a breathable package, namely, one which will allow ventilation of the bacon therein, membrane 16 is advantageously of breathable plastic. Any suitable plastic which is heat sealable can be employed for such purpose. The preferred plastic film is conventional biorientated polystyrene of about 1 mil (0.001 inch) in thickness because it is not only breathable but also heat seals readily to the preferred polystyrene tray material. Other suitable breathable films are wax coated cellulose acetate and wax coated glassine; and if the package is made of the nonbreathable type, which is not required when the packaging is under vacuum and gas flushing, both the film and the tray can be of gas impermeable material. For example, the tray can be of heavy foil and the membrane of relatively gas impermeable heat sealable plastic film, such as polyethylene or polypropylene.

An inspection window is advantageously formed in cover panel 14 by providing an interior hinged section or flap 22 formed by end and side slit lines 23, and hinge score line 24. When the window is opened by lifting flap section 22 upwardly, the contents of the package can be readily inspected. Not only does this window provide for inspection but the opening about flap 22 formed by slit lines 23 permits ventilation through the portion of membrane 16 underlying the flap 22.

When the membrane 16 of cover structure 9 is heat sealed all around seating shoulder 6 with the cover structure snap locked over the package contents, as shown in FIG. 1, even though the tray itself can be readily flexed, the membrane adhered to seating shoulder 6 holds the tray in shape so that its sides will not bow out, to thus maintain the configuration of the package. Consequently, the construction is such that a plurality of packages can be easily stacked one upon the other, as shown in FIG. 13, with the bottom of an overlying tray seated in well 8 of an underlying tray.

Figure 4:
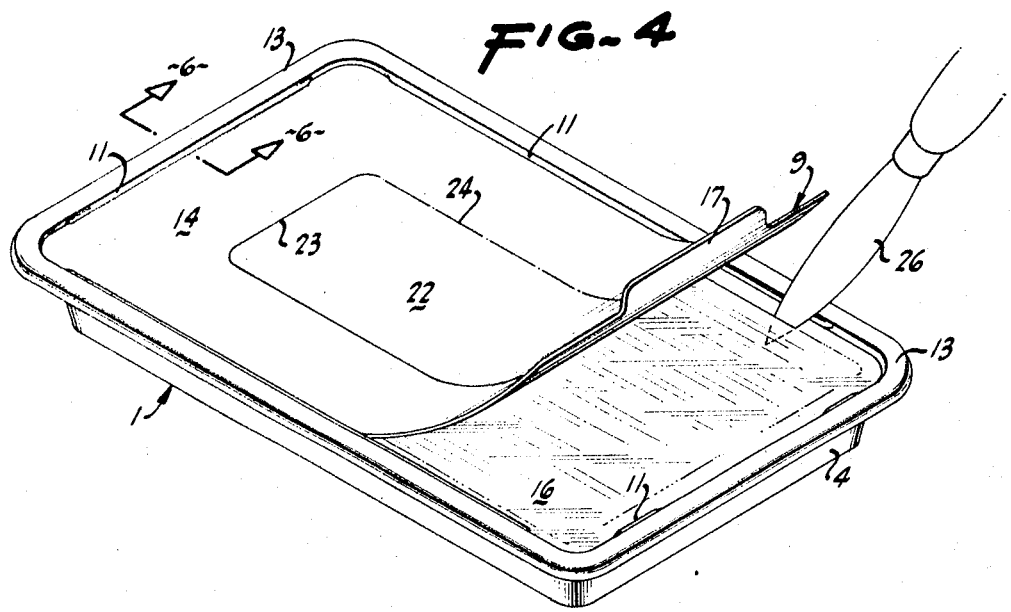
FIG. 4 is an isometric view of the package illustrating the cover partially unlocked, and the manner in which the membrane attached to the cover panel is cut to obtain access to the contents in the package.
Figure 5:
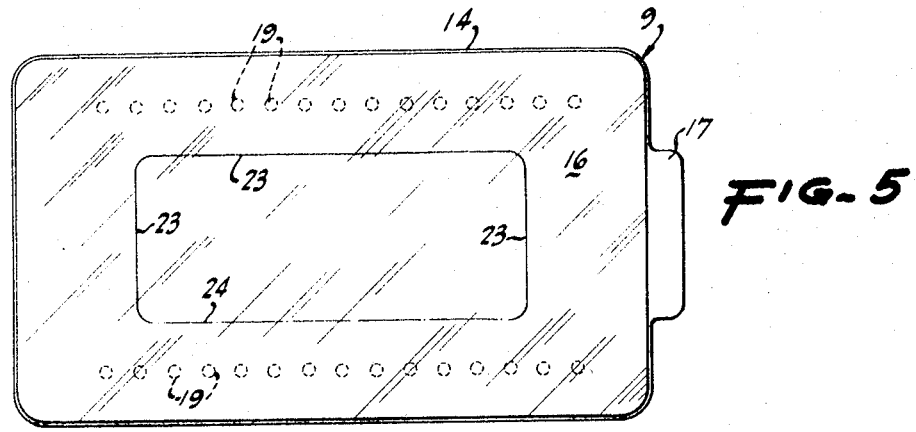
FIG. 5 is a plan view of the cover structure looking at the underside thereof, namely, the membrane side.
Figure 6:
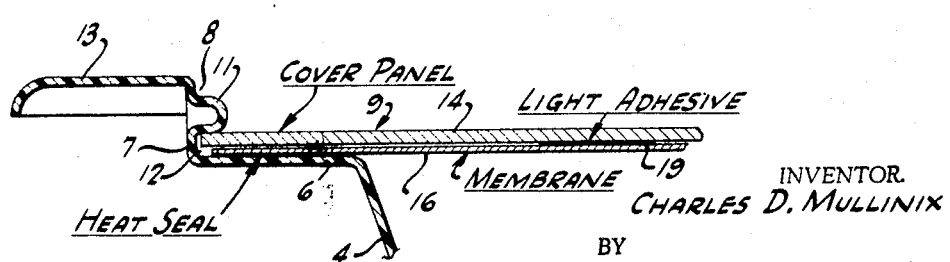
FIG. 6 is an enlarged fragmentary vertical section taken in the plane indicated by the line 6—6 of FIG. 4.

After a package is formed resulting from a cover structure 9 being heat sealed to the tray with contents therein, ready access can be had to the contents by pulling upwardly on pull tab 17, and peeling cover panel 14 completely off of membrane 16 as indicated in FIG. 7, or partially off as indicated in FIG. 4. By means of a knife 26, the consumer can quickly slit the membrane adjacent the edges thereof to enable it to be lifted for removal of contents. In this connection, it will be noted that if the entire contents of the package are not to be removed at one time, by partial slitting of membrane 16 along opposite side edges and one end edge, as indicated in FIG. 4, the cover structure can be partially unhinged and then reclosed over the membrane by snap locking it again under beads 11. Thus, in effect, cover structure 9 can serve as an openable and reclosable hinged cover until all the contents of the package are consumed.

The described tray and cover structure assembly lend themselves readily to economical and efficient packaging. All that need be done is to place conventionally shingled bacon in the tray part which can be done manually or by automatic equipment, whereby humps 3 impart a relatively flat upper surface to the bacon; position the cover structure over the tray; force it uniformly downwardly to snap lock under bead portions 11, and then apply heat and pressure either to the underside of shoulder 6 or to the top of cover panel 14 or to both to transmit heat to membrane 16 and thus effect tight heat sealing of the membrane to seating shoulder 6.

FIG. 8 illustrates schematically a suitable type of apparatus for effecting the packaging method. A rectangular shaped ring 31 conforming to the outside configuration of tray sides 4 is provided, and has a flat top 32 to support shoulder flange 6 of the tray evenly thereon; the ring thus serving as a support form for the tray to hold it in position during the cover locking and heat sealing operations.

Cover structure 9 with membrane 16 bonded to cover panel 14 is positioned centrally over the top of the tray; and a platen 33 moves the cover structure 9 downwardly to force the same onto the tray under beads 11 to snap lock it in the manner described. A rectangular shaped heat sealing ring 34 conforming to the shape of tray seating shoulder 6, is then moved downwardly about platen 33 with pressure against the peripheral edge portion of cover panel 14 to cause electrical heating elements 35 in the ring to apply heat to the top of cover panel 14 and effect the aforementioned heat sealing by transmission of such heat through the cover panel. If desired, support ring 31 can be provided with heat sealing elements to apply heat through seating flange 6.

Referring now to the embodiment of FIGS. 9 through 12, the tray structure is the same as that described, except for minor differences. Therefore, the same reference numerals are applied to common parts of the tray. In principle, the overall package is also the same except that the cover structure, including membrane 36 and cover panel 37 are snap locked to the tray and the membrane is bonded to the tray seating shoulder in such manner as to provide a hinged cover structure with which the membrane is always automatically movable thus obviating cutting of the membrane for obtaining access to the package contents. Both the cover panel and the membrane are of the same materials previously described.

Figures 9, 10:
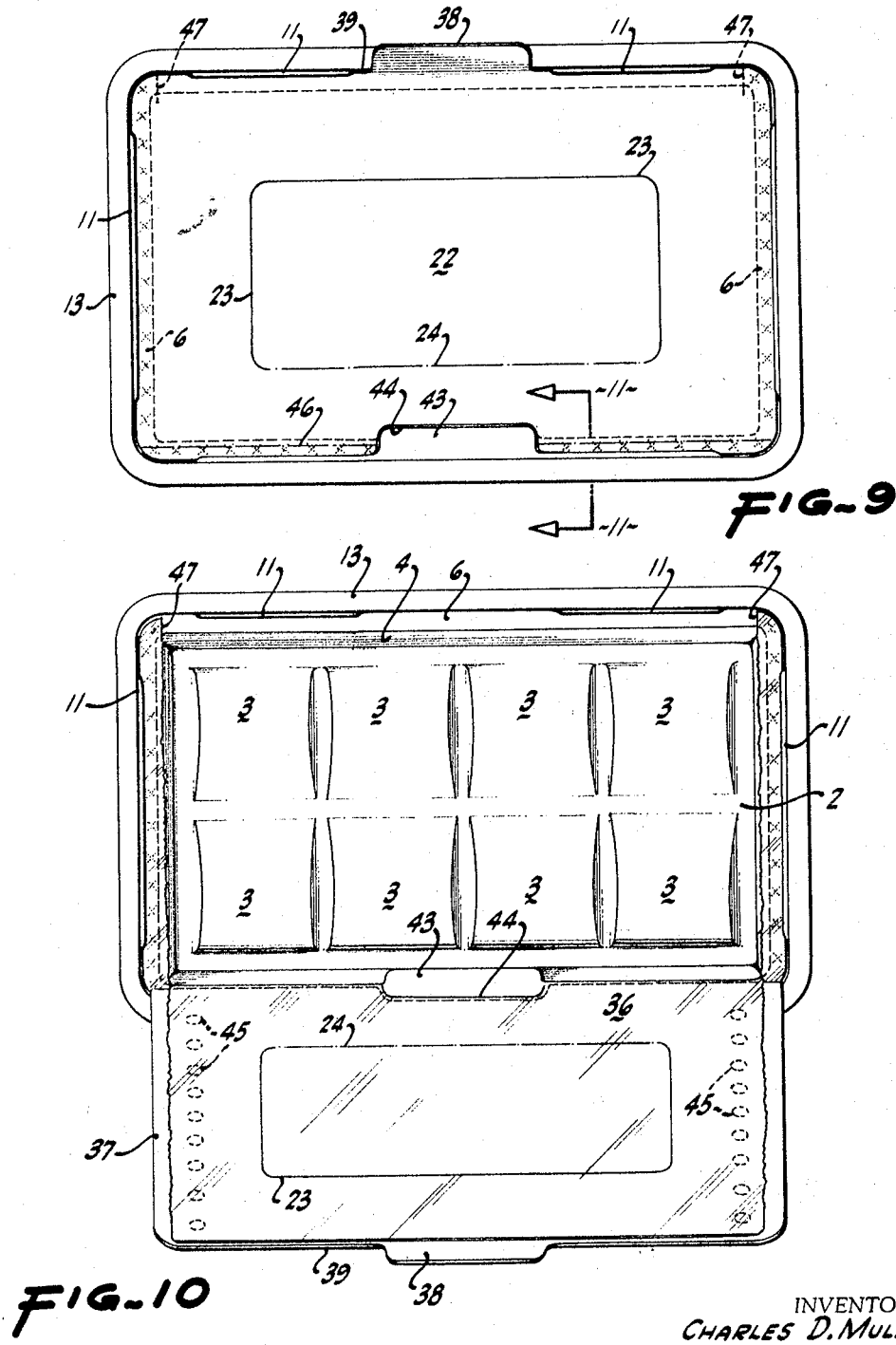
FIG. 9 is a plan view, similar to FIG. 1, of another embodiment of the invention.
FIG. 10 is a similar view of such embodiment but with the cover structure unhinged.

The cover structure is provided with a pull tab 38 along one longitudinal side edge 39 thereof and membrane 36 is not heat sealed to the portion of the tray seating shoulder adjacent such side edge 39 but only to the opposite and end shoulder seating portions as indicated by the stippled crosses in FIGS. 9 and 10. Cover panel 37 with membrane 36 attached thereto is snap locked under beads 11 in the same manner as previously related but a central projection 43 is formed between beads 11 on the shoulder portion of the tray opposite to that to which membrane 36 is not bonded. This projection serves solely to fill up a space 44 formed in cover panel 37 from which tab 38 is cut out in adjacent panel when the cover panels are cut from a parent sheet of material to conserve material in a well known manner.

Membrane 36 is bonded to the underside of cover panel 37 by spots of adhesive 45 which can be of the same type described previously but since in the embodiment under discussion, the cover panel is not peeled off the membrane in opening the package, it can be of any other type. The rows of adhesive preferably extend transversely of the cover structure. At the edge opposite the pull tab edge 39, a score line 46 is desirably provided to enhance the hinge connection of the cover adjacent such edge for opening and closing the same.

When pull tab 38 is lifted upwardly, the entire cover panel 37 will slip out from under the end snap lock bead portions of the tray and unhinge about score line 46; and the membrane 36 will tear along its opposite end edges while remaining attached to the cover panel 37, as indicated in FIG. 10. In this connection, a short slit 47 is desirably formed initially to extend inwardly a short distance from the pull tab edge of membrane 36 adjacent each end of the membrane and inwardly of the adjacent tray seating shoulder to which the membrane is heat sealed, so that when the cover structure is unhinged to open the same, tearing of the membrane along the opposite end edges thereof will be facilitated. However, such slits may be omitted as the membrane will tear along its end edges without the slits, but the slits insure starting of even tearing of the membrane.

The method of heat sealing this embodiment is the same as that previously described, except that heat sealing elements in ring 34 are omitted along the part of the ring adapted to overlie the portion of seating shoulder 6 adjacent the pull tab 38.

FIGS. 13 through 15 illustrate another embodiment wherein the cover panel 14' and tray part 1' are both of substantially the same configuration, respectively, as those of FIGS. 7 through 12. As with respect to the embodiment of FIGS. 1 through 7, when the package is formed, heat sealable membrane 16' is heat sealed to peripheral seating shoulder 6' along all edges thereof as indicated by the stippled lines in FIG. 13; and membrane 16' is adhered to the cover panel along zones of adhesive 45' having a weaker bond to the cover panel than the heat seal bond of the membrane to the seating shoulder 6' so that the cover panel can be peeled off the membrane when the package is opened.

To facilitate hinging of the cover panel for repeated opening and closing thereof, it is provided with a longitudinal score line 46' spaced inwardly from edge 51 of the cover panel opposite the pull tab 38' as to be positioned inwardly beyond the seating shoulder portion 6' adjacent edge 51 as shown in FIG. 13, and the membrane is adhered by a longitudinally extending line of adhesive 52 to the cover panel between such score line 46' and the cut out 44' which fits about central tray projection 43'. Also, it will be noted that the tray locking bead portions 11' adjacent cover panel edge 51 terminate in rounded corner portions 11a which extend to score line 46', and the opposite longitudinal edge of the tray is provided with similar rounded corner bead portions 11b which are spaced from bead portions 11c adjacent a central tray recess 53 which accommodates pull tab 38' which has a score line 54 hinge connection to the cover panel.

As a result, the cover panel will have a substantially permanent hinge connection along edge 51, as shown in FIG. 15, enabling it to be repeatedly opened and closed after it is peeled from the membrane in the manner already explained, to thus enable full inspection by purchasers of the entire contents in the tray before making a purchase. To obtain access to the contents after the cover panel is first unhinged for opening the same, the membrane is cut in the manner indicated in FIG. 4. Snap locking and heat sealing of the cover structure to the tray after the tray has been filled with contents is effected in the same manner as with respect to the modification of FIGS. 1 through 7.

What is claimed is:

1. A food package comprising a tray having a substantially straight longitudinal edge and having a cover-structure-seating-shoulder adjacent its periphery; and a cover structure supported by said shoulder, said cover structure comprising a cover panel having a light-transmitting membrane of heat-sealable material adhered to the underside of said panel, said membrane being heat-sealed adjacent its peripheral edges to said seating-shoulder; said tray having a flange extending upwardly from and adjacent the seating shoulder of the tray and a plurality of spaced beads projecting inwardly from said flange above said shoulder and providing spaces over said shoulder in which edge portions of said cover panel are removably snap locked, the cover panel having an outwardly projecting pull tab opposite said straight longitudinal edge and a longitudinally extending straight score line forming a hinge connection spaced inwardly of said longitudinal straight edge, the membrane being adhered to said cover panel in the area between said longitudinal straight edge and said score line, said membrane being unattached to said pull tab portion, the bond between the membrane and the cover panel in the area between said score line and the edge opposite said longitudinal straight edge being weaker than the heat seal bond between said membrane and said seating-shoulder portions to enable the cover panel to be peeled from said membrane upon pulling of said pull tab while said membrane remains bonded to said shoulder portions, and the bond between said membrane and said cover panel in the area between said longitudinal straight edge and said score line being stronger than said bond between said membrane and said cover panel in the area between the score line and the edge opposite said longitudinal straight edge.

2. The food package as defined in claim 1, wherein the tray is substantially rectangular.

3. The food package as defined in claim 1, wherein the tray is of breathable molded plastic material, and the bead structure projects inwardly from a mid-portion of said flange.

References Cited
UNITED STATES PATENTS

| | | | |
|---|---|---|---|
| 2,241,710 | 5/1941 | Lowey | 229—14 |
| 3,154,225 | 10/1964 | Wadlinger et al. | 222—485 |
| 3,301,464 | 1/1967 | Amberg | 229—43 |
| 3,317,068 | 5/1967 | Betner | 215—39 |

A. LOUIS MONACELL, Primary Examiner

W. C. LAWTON, Assistant Examiner

U.S. Cl. X.R.

99—174; 229—43, 51